US008266927B2

(12) United States Patent
Sowa

(10) Patent No.: US 8,266,927 B2
(45) Date of Patent: Sep. 18, 2012

(54) METHOD FOR PRODUCING A CYLINDER OF QUARTZ GLASS AND HOLDING DEVICE FOR CARRYING OUT THE METHOD

(75) Inventor: Rene Sowa, Pouch (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 404 days.

(21) Appl. No.: 12/459,003

(22) Filed: Jun. 24, 2009

(65) Prior Publication Data

US 2009/0324817 A1 Dec. 31, 2009

(30) Foreign Application Priority Data

Jun. 25, 2008 (DE) .......................... 10 2008 029 756

(51) Int. Cl.
*C03B 37/018* (2006.01)

(52) U.S. Cl. ................ 65/421; 65/272; 65/277; 65/278; 65/280; 65/292; 65/293; 65/296; 65/299; 65/413; 65/294; 65/427

(58) Field of Classification Search .................... 65/272, 65/277, 278, 280, 292, 293, 294, 296, 299, 65/413, 421, 427
See application file for complete search history.

(56) References Cited

U.S. PATENT DOCUMENTS

| | | | |
|---|---|---|---|
| 2,210,096 A * | 8/1940 | Pennell | ......................... 403/303 |
| 4,157,906 A | 6/1979 | Bailey | |
| 4,362,545 A | 12/1982 | Bailey et al. | |
| 5,665,132 A | 9/1997 | Ruppert et al. | |
| 5,738,702 A | 4/1998 | Ruppert et al. | |
| 7,387,000 B2 | 6/2008 | Kotulla et al. | |
| 2004/0065121 A1 | 4/2004 | Kotulla et al. | |
| 2006/0144094 A1 | 7/2006 | Roselieb et al. | |

FOREIGN PATENT DOCUMENTS

| | | |
|---|---|---|
| DE | 100 64 730 A | 7/2002 |
| DE | 103 03 290 B3 | 5/2004 |
| EP | 701 975 A2 | 3/1996 |

* cited by examiner

*Primary Examiner* — Queenie Dehghan
(74) *Attorney, Agent, or Firm* — Tiajoloff and Kelly LLP

(57) ABSTRACT

A known method for producing a cylinder of quartz glass comprises a soot depositing process, in which $SiO_2$ particles are deposited on an elongate carrier rotating about an axis of rotation with formation of a porous, hollow-cylindrical soot body, and a sintering process in which the soot body comprising an inner bore with inner wall, a longitudinal axis, an upper end and a lower end is held suspended in vertical orientation in a furnace, a holding element being provided for holding purposes, which projects from the upper end into the inner bore of the soot body and acts on a bearing provided in the inner bore. Starting from this, to indicate a method by means of which even heavy bodies of porous $SiO_2$ with a small inner diameter can be safely held during sintering, it is suggested according to the invention that the bearing should be provided as an expanding bearing having at least one spreading element which is movable against the inner wall of the inner bore and which under the action of the holding element performs a movement with a movement component in a direction perpendicular to the longitudinal axis of the soot body and is pressed against the inner wall.

13 Claims, 2 Drawing Sheets

Figure 1:
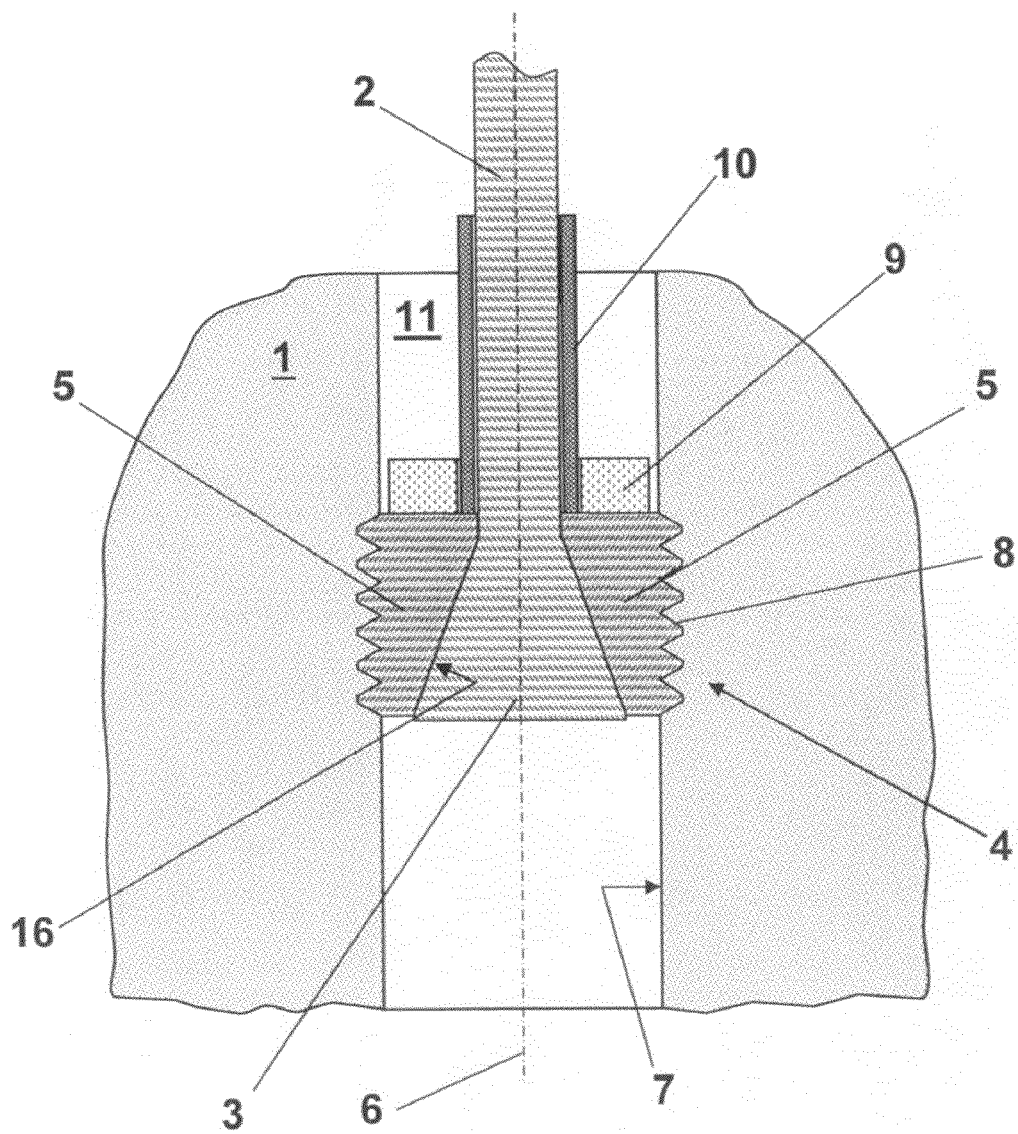

METHOD FOR PRODUCING A CYLINDER OF QUARTZ GLASS AND HOLDING DEVICE FOR CARRYING OUT THE METHOD

The present invention relates to a method for producing a cylinder of quartz glass, the method comprising a soot depositing process, in which $SiO_2$ particles are deposited on an elongate carrier rotating about an axis of rotation with formation of a porous, hollow-cylindrical soot body, and a sintering process in which the soot body comprising an inner bore with inner wall, a longitudinal axis, an upper end and a lower end is held suspended in vertical orientation in a furnace, a holding element being provided for holding purposes, which projects from the upper end into the inner bore of the soot body and acts on a bearing provided in the inner bore.

Furthermore, the present invention relates to a holding device for producing a cylinder of quartz glass by sintering a tubular soot body which comprises an inner bore with inner wall, a longitudinal axis, an upper end and a lower end, according to the method according to any one of the preceding claims, comprising a holding element which acts on a bearing provided in the inner bore.

PRIOR ART

Hollow cylinders or tubes of synthetic quartz glass are used as intermediate products for a great number of components for the optical and chemical industry and particularly for making preforms for optical fibers and for further processing into lens blanks for microlithography.

In the so-called "soot method", the manufacture of the intermediate product comprises a $SiO_2$ deposition process, wherein a porous blank is formed from $SiO_2$ particles (here called "soot body" or "soot tube"), which is subsequently sintered into a quartz glass cylinder.

The sintering of a soot tube (also called "vitrification") may be carried out such that the inner bore of the soot tube collapses completely at the same time, resulting in a solid cylinder. U.S. Pat. No. 4,157,906 A, for instance, discloses a method in which a $SiO_2$ soot tube is sintered in a method step, the inner bore is collapsed in this step and elongated into a fiber at the same time. For mounting the $SiO_2$ soot tube in a drawing and vitrifying furnace in vertical orientation, a tube section of quartz glass having a length of about 50 mm is inserted into the inner bore of the soot tube, the outer diameter of said tube section corresponding approximately to the inner diameter of the inner bore, and the tube section having bump-like thickened portions at its end intended for insertion into the inner bore. To anchor the quartz glass tube, the bumps are rotated about 90° in the inner bore, resulting in a positive connection resembling a bayonet lock. The soot tube is held suspended at its upper end from the turned-in holder and is supplied to a heating zone, starting with its lower end, and is softened therein zone by zone and elongated into a fiber.

When the tube section is driven into the wall of the soot tube, particles are generated that deposit on the inner wall of the soot tube and may affect the further process. Moreover, there may be breakouts and cracks that make the soot tube useless or may later lead to a breaking away of the holder.

It has also been suggested that during the deposition process in which the soot body is deposited on a carrier rotating about its longitudinal axis, a holder of quartz glass should be embedded into the evolving soot body. At its end projecting into the soot body the holder has a surrounding collar which establishes a positive connection with the soot body, and the end projecting out of the soot body can be used for the suspended mounting of the soot body in subsequent process steps. Such a method is e.g. known from U.S. Pat. No. 4,362,545 A.

Since the carrier is moving (rotating) in the deposition process, an existing mechanical play between carrier and holder to be embedded may have the effect that the gap between carrier and holder cannot be bridged by the soot layer or that it tears open again, so that the holder is inadequately embedded in the soot body. It is therefore difficult to reproduce the embedment of the holder, and the strength of the connection can hardly be checked.

As a rule, it should also be noted that with enhanced productivity increasingly larger quartz glass cylinders are demanded, so that the weights of the soot tubes to be sintered are also increasing more and more. With the above-described procedures it is difficult to mount heavy soot tubes in a safe way.

In the method known from EP 701 975 A2, the soot tube is introduced into a vitrification furnace and is held therein in vertical orientation by means of a holding device which comprises a holding rod which extends from above through the inner bore of the soot tube and which is connected to a holding base on which the soot tube is standing with its lower end at the beginning. The holding rod consists of carbon fiber-reinforced graphite (CFC; carbon fiber reinforced carbon), and it is closely surrounded by a gas-permeable, thin-walled cladding tube of pure graphite. In a position above the upper end of the cladding tube a graphite support ring which projects inwards is embedded in the inner bore of the soot tube.

During sintering the soot tube is vitrified zone by zone, starting with its upper end. The soot tube is here collapsing in successive order onto the cladding tube of graphite and is also shrinking in its length, the tube standing in a first sintering phase on the holding base. The position of the graphite support ring embedded in the soot tube is chosen such that it is supported in a second sintering phase due to the increasing longitudinal shrinkage on the cladding tube of graphite, so that the soot tube is then held suspended at the upper end. While the soot tube is shrunk onto the cladding tube of graphite, impurities found in the graphite, particularly metallic impurities, may get detached and introduced into the quartz glass of the soot tube. Due to contact with the cladding tube, the hollow cylinder produced in this way also exhibits a rough inner surface with baked-in graphite particles. After sintering the cladding tube is removed, and the inner bore of the resulting quartz glass tube is reworked by drilling, grinding, honing or etching.

This method is time-consuming, causes losses in terms of material as well as impurities due to the graphite linkage.

To reduce the graphite contact surfaces a sleeve of synthetic quartz glass is provided in a modification of this method according to DE 103 03 290 B3 between the holding rod and the sintering soot tube. The manufacture of said sleeve entails great expenditure in terms of time and costs, and it is or becomes part of the sintered quartz glass tube. Impurities caused by the graphite linkage and transported via the gas phase, as well as undesired changes in the furnace atmosphere due to the reducing action of graphite, can however not be avoided.

The method according to DE 100 64 730 A avoids these drawbacks. This publication also discloses a device of the type indicated at the outside. $SiO_2$ particles are here deposited on an elongate carrier which is rotating about its longitudinal axis and which over its length contains a step in its outer diameter. After the stepped carrier has been removed, a porous, hollow-cylindrical soot body is obtained, which includes an inner bore with a shape complementary to the carrier diameter profile; this means that it has a larger inner diameter over a longer partial length and a smaller inner diameter over a shorter partial length and a step-like shoulder thereinbetween. The resulting soot body is vitrified while suspended in vertical orientation in a furnace, the narrowed region of the inner bore being arranged at the top and a holding rod that projects from the top into the inner bore gripping under the step-like shoulder.

The safe mounting of a heavy soot body requires a relatively large shoulder of the inner bore, which is achievable through a correspondingly large shoulder in the carrier diameter profile. The large shoulder automatically necessitates a large outer diameter of the carrier. For reasons of high productivity, however, soot bodies are desired with an inner bore that is as small as possible. These necessitate the use of a carrier that is as thin as possible in soot body manufacture.

Similar problems arise also in the sintering of other bodies of porous $SiO_2$, which have not been produced via the $SiO_2$ soot method route, e.g. in porous $SiO_2$ bodies that have been obtained through the known sol-gel route or through pressing methods.

TECHNICAL OBJECT

It is the object of the present invention to improve the generic method such that even heavy bodies of porous $SiO_2$ with a small inner diameter can be safely held during sintering.

Moreover, it is the object of the present invention to provide a constructionally simple and operationally reliable holding device for performing the method.

DETAILED DESCRIPTION

As for the method, this object, starting from the method indicated at the outset, is achieved according to the invention in that the bearing is provided as an expanding bearing having at least one spreading element which is movable against the inner wall of the inner bore and which under the action of the holding element performs a movement with a movement component in a direction perpendicular to the longitudinal axis of the soot body and is pressed against the inner wall.

In the method of the invention a holding device is provided for holding the soot body during sintering, the holding device comprising an expanding bearing and a holding element. For the suspended mounting of the soot body the holding elements acts on the expanding bearing arranged in the upper portion of the inner bore of the soot body. The bearing comprises a movable spreading element cooperating with the holding element such that due to this action it carries out a movement towards the inner wall of the inner bore. Due to this movement the spreading element is pressed against the inner wall or is even driven a short way into the inner wall. The movement against the inner wall is stopped by the resistance put up by abutment of the spreading element on the inner wall or in the soot body wall. This establishes a frictional or positive connection between the expanding bearing and the soot body, said connection yielding a particularly safe and reproducible mounting of the soot body, i.e. also without any treatment of the special geometric design of the inner bore.

The holding element and the expanding bearing need not be made of graphite. A special advantage of the holding device is that it manages either entirely or mainly without the use of graphite members in the inner bore, so that impurities, as may pass from the graphite linkage in the known method into the soot body, are avoided. The holding device is used in the vitrification of the $SiO_2$ body or in other process steps, such as dehydration, a doping process or for the transportation of the $SiO_2$ body. It may also be helpful in guiding a vertically oriented soot body standing on a platform with its lower face or counteract a collapsing of the soot body during sintering by fixing the upper held soot body end.

Preferably, the holding element comprises at least one lower slide surface that grips under the spreading element and extends at a wedge angle relative to the longitudinal axis, viewed from the top to the bottom, in the direction of the inner wall.

The (lower) slide surface extends, viewed from the top to the bottom, in oblique fashion relative to the longitudinal axis, and it cooperates with the spreading element in a way that it grips under the spreading element. When the holding element is lifted, the oblique orientation yields the desired movement of the spreading element towards the inner wall if a lifting of the spreading element is suppressed at the same time, for instance by a counter force from above or by an already existing frictional force between the spreading element and the inner wall. The upward movement of the holding element and the accompanying lateral movement of the spreading element thereby establish a clamp connection between expanding bearing and soot body. The slide surface allows a sliding of the spreading element when the holding element is lifted. In the simplest case the surface of the slide area is therefore smooth. To reduce adhesion relative to the spreading element, it may also be corrugated, grooved, slotted, stepped, or the like, as long as the contact area of the spreading element resting on said surface can slide thereon.

The lower slide surface may be provided as a wedge-shaped oblique area at a side of the holding element, or it may be composed of several wedge areas distributed around the longitudinal axis. In the simplest and therefore particularly preferred case the lower slide surface is configured as an outer cone of the holding element.

The lower end of the holding element is here configured as an outer cone that grips under the spreading element.

In this connection it has turned out to be advantageous when the at least one spreading element comprises an upper slide surface cooperating with the lower slide surface, which extends at the wedge angle, viewed from the top to the bottom, in the direction of the inner wall.

The spreading element has an upper slide surface which extends at the same oblique angle relative to the longitudinal axis as the lower slide surface of the holding element. Upon lifting of the holding element upper and lower slide surfaces are sliding on each other, thereby effecting a lateral movement of the spreading element and the clamp connection between soot body and expanding bearing.

It has turned out to be useful when a plurality of movable spreading elements are provided that have upper slide surfaces forming a downwardly open inner cone of the expanding bearing.

The spreading elements are here configured as ring segments which jointly form a closed ring while enclosing an inner cone of the expanding bearing. These are moved apart under the action of the holding element and pressed against the inner wall in this process. This permits a symmetric arrangement of the ring segments about the longitudinal axis. In the simplest case two opposite ring segments are provided in the form of semi-shells. Each of the ring segments has a slide surface that forms a section of a downwardly open inner cone, and with which it slidingly rests on the lower slide surface of the holding element.

The lower slide surface of the holding element which projects from below into the inner cone so to speak serves as a spreading wedge that presses the spreading elements against the inner wall during lifting of the lower slide surface (of the holding element), so that it gets jammed in cooperation with the weight of the soot body in the inner wall thereof.

Preferably, the wedge angle is between 60° and 80°, preferably around 60°.

With a wedge angle in this range one obtains, upon lifting of the holding element, a force substantially perpendicular to the longitudinal axis in the direction of the inner wall and thus an optimum clamping action between expanding bearing and soot body.

Moreover, it has turned out to be advantageous when the at least one spreading element has a friction surface which extends in parallel with the inner wall and which upon movement in a direction perpendicular to the longitudinal axis of the soot body is pressed against the inner wall.

The friction surface of the spreading element effects increased friction with the inner wall of the soot body or a reinforced form closure, thereby contributing to the strength of the connection of soot body and expanding bearing.

In a preferred variant of the method, the expanding bearing has an upper side on which a ring element of quartz glass is positioned that has an outer diameter which is not more than 10 mm smaller than the inner diameter of the inner bore.

The outer diameter of the ring element is adapted to the inner diameter of the inner bore. During sintering of the soot body the inner bore slightly collapses, so that the inner wall shrinks onto the ring element on all sides from the outside. This achieves a form closure with the expanding bearing, resulting in an improved centering of the bearing. Preferably, the ring element has a planar upper side, so that it additionally forms an edge from which the vitrified soot body shrinking thereonto can be suspended.

Furthermore, it has turned out to be advantageous when the holding element projects with a longitudinal section into the inner bore and that at least part of said longitudinal section is surrounded by a protective sleeve, preferably of quartz glass.

The protective sleeve serves to shield the holding element relative to the heating zone and reduces the risk of softening and deformation during sintering of the soot body.

The holding element may e.g. consist of graphite, CFC, SiC or $Al_2O_3$. To keep the amount of introduced impurities as small as possible, the expanding bearing and the holding element, however, are preferably made of quartz glass, particularly preferably of synthetic quartz glass and thus of a material true to type with respect to the material of the soot body.

In the simplest case the spreading element performs the movement with movement component in a direction perpendicular to the longitudinal axis of the soot body under action of the holding element and the weight of the soot body.

Here the force causing the movement of the spreading element results from the weight of the hanging soot body or it makes at least a considerable contribution to the movement of the spreading element. This force is transmitted via the holding element to the spreading element.

As for the device, the above-indicated object, starting from a device with the features of the above-indicated type, is achieved according to the invention in that the bearing is provided as an expanding bearing having at least one spreading element which is movable against the inner wall of the inner bore and which under the action of the holding element is supported to be pressed against the inner wall of the soot body.

The holding device according to the invention comprises an expanding bearing and a holding element which for the suspended mounting of the soot body acts on the expanding bearing. The expanding bearing comprises at least one movable spreading element cooperating with the holding element such that due to this action it carries out a movement towards the inner wall of the inner bore and is thereby pressed against the inner wall or even driven a short way into the inner wall. This establishes a frictional or positive connection between the expanding bearing and the soot body, said connection yielding a particularly safe and reproducible mounting of the soot body.

The holding device according to the invention requires no or substantially no graphite members used in the inner bore, so that impurities as may pass from the graphite linkage in the known method into the soot body are avoided.

The holding device is used in the vitrification of the $SiO_2$ body or in other process steps, such as dehydration, a doping process or for the transportation of the $SiO_2$ body.

Advantageous developments of the device according to the invention follow from the sub-claims. Insofar as designs of the device indicated in the sub-claims imitate the procedures indicated in sub-claims with respect to the method according to the invention, reference is made for supplementary explanation to the above comments on the corresponding method claims.

PREFERRED EXAMPLES

The invention shall now be explained in more detail hereinafter with reference to embodiments and a drawing. In the drawing in a schematic illustration FIG. 1 shows a first embodiment of the holding device according to the invention; and FIG. 2 shows a second embodiment of the holding device according to the invention.

Figure 2:
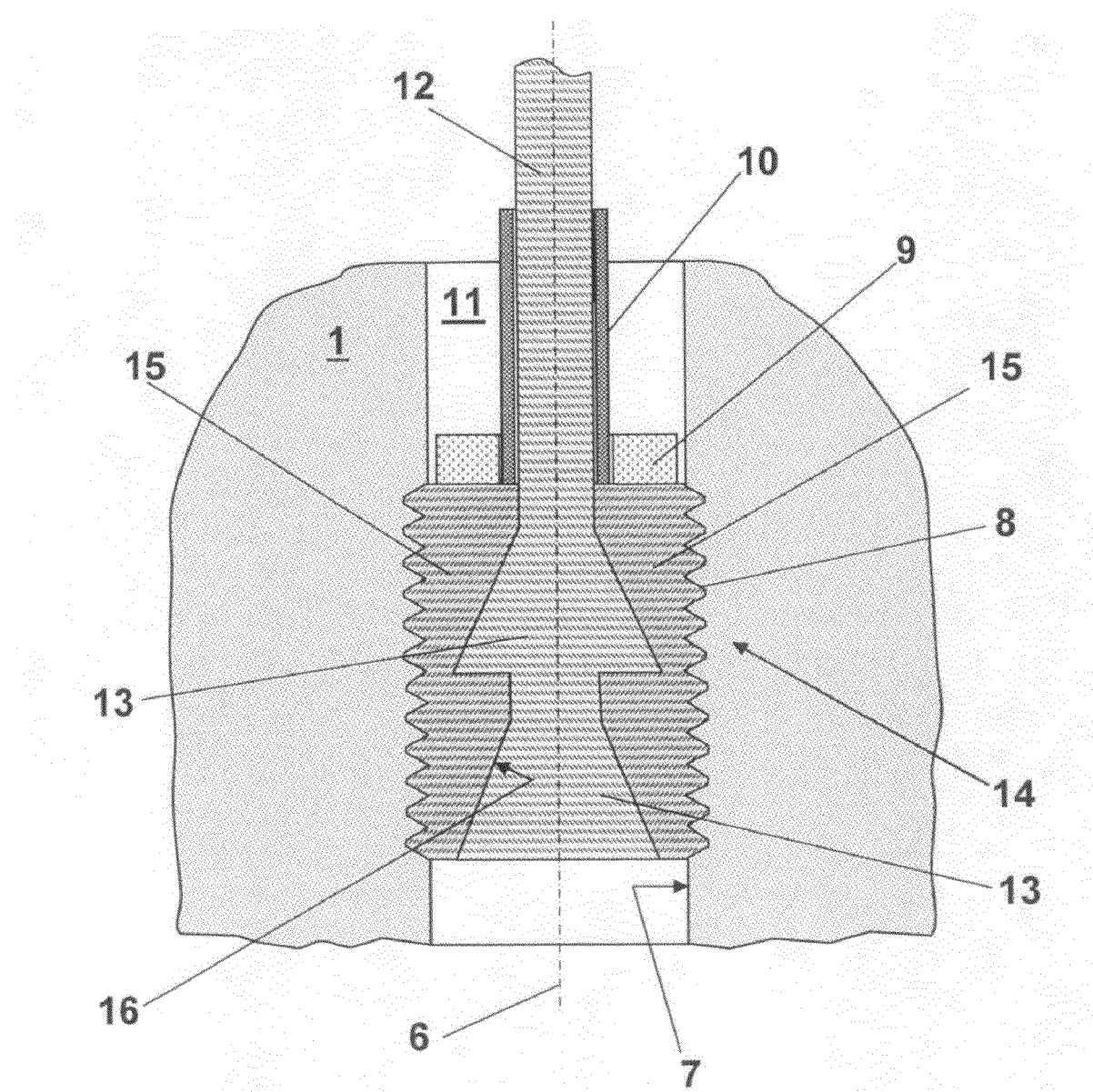

The holding device according to FIG. 1 serves to mount and transport a tubular soot body 1. The holding device is essentially made up of a holding rod 2 of quartz glass, the lower end of which is shaped in the form of an outer cone 3 with a cone angle 70°, and of an expanding bearing, to which reference numeral 4 is assigned on the whole.

The expanding bearing 4 is composed of two clamping bodies 5 shaped in the form of half shells (180°), which enclose a downwardly open inner cone with a cone angle of also 70°, and which is complementary to the outer cone 3 of the holding rod 2. In this respect the inner cone of the clamping bodies 5 forms a slide surface 16, along which the outer cone 3 can be moved upwards (and downwards). The height of the inner cone, viewed in the direction of the longitudinal axis 6, is 5 cm. The outwardly oriented cylindrical outer surface 8 of the clamping bodies 5 is strongly grooved for increasing the frictional force relative to the inner wall 7 and has a height of 6 cm.

A ring disk 9 of quartz glass with a thickness of 2.5 cm and an outer diameter of 4.5 cm is positioned on the upper side of the clamping bodies 5.

The lower longitudinal section of the holding rod 2 which projects into the inner bore 11 of the soot body 1 is surrounded by a protective sleeve 10 of quartz glass, the inner diameter of which is adapted to the outer diameter of the holding rod (2.5 cm) and which is also standing on the upper side of the clamping bodies 5. The outer diameter of the protective sleeve 10 is 4 cm, which corresponds to the inner diameter of the ring disk 9.

All parts of the holding device shown in FIG. 1 are made of quartz glass. A vitrification linkage with components of graphite or of CFC is omitted.

In the embodiment of the holding device according to FIG. 2 identical or equivalent components and parts of the device are provided with the same reference numerals as in FIG. 1. In this embodiment an expanding bearing 14 is provided that is extended in comparison with the embodiment of FIG. 1 in the direction of the longitudinal axis 6. To be able to observe the same cone angle of 70° as in the embodiment of FIG. 1, despite the expanding bearing 14 having about twice the height, the two clamping bodies 15 in the form of semi-shells (180°) are here formed with two superposed inner cones. These correspond to corresponding outer cones 13 of the holding rod 12, which are interconnected via a cylindrical section.

This embodiment of the holding device has twice the guide length, resulting in an improved centering and concentric guiding of the holding rod 12 relative to the longitudinal axis 6.

A method for producing a hollow cylinder of quartz glass according to the method of the invention shall now be explained in more detail.

With the help of a standard OVD process, $SiO_2$ particles are produced by flame hydrolysis of $SiCl_4$ using an arrangement of deposition burners reversingly moved along a carrier tube rotating about its longitudinal axis and are deposited on the carrier while gradually forming a soot body 1.

Upon completion of the OVD process the carrier tube is removed and a tubular soot body 1 is obtained having an inner diameter of 5 cm, an outer diameter of 35 cm and a length of about 3 m.

The soot body 1 is dried, in the standard way, in a chlorine-containing atmosphere at a high temperature and is then vitrified in vertical orientation to obtain a hollow cylinder of quartz glass. The vitrification of the soot body 1 is carried out using the holding device shown in FIG. 1. The soot body 1 is first vertically erected, and the holding rod 2, the protective sleeve 10, the ring disk 9 and the clamping bodies 5 are thereupon introduced from above into the inner bore 11 of the soot body, as shown in FIG. 1. It is here essential that the outer cone 3 grips the inner-cone slide surface 16 formed by the clamping bodies 5 from below.

The upper end of the holding rod 2 is craned. In lifting he holding rod 2, and due to the wedge action by the meshing cones, the laterally movable clamping bodies 5 are pressed outwards, whereby they are anchored in the inner wall 7 of the soot body 1. The grooved cylindrical outer surface 8 of the clamping bodies 5 is here penetrating into the wall of the soot body 1 to some extent, resulting in a frictional and positive connection between the expanding bearing 4 and the soot body 1.

With the help of this holding device the soot body 1 is introduced into a vitrification furnace and held therein with vertically oriented longitudinal axis 6. Several method variants are suited for vitrification. These shall be explained in detail hereinafter:

One variant of the method provides for zonewise vitrification of the soot body 1 from the bottom to the top. The soot body 1 is here held suspended in the vitrification furnace by means of the holding device. As soon as the vitrification zone has reached the upper portion with the expanding bearing inserted into the inner bore 11, the vitrification process is terminated, so that the holding device of quartz glass does not soften. The protective sleeve 10 is conducive to the thermal shielding of the holding rod 2.

In addition to the suspended mounting by means of the holding device, the soot body 1 may also be standing on a platform right from the beginning of the vitrification process. In this modification of the vitrification method the holding device serves to orient and fix the upper soot body end, thereby avoiding elongation in the course of the vitrifying process.

In a further variant of the method, the soot body 1 is vitrified zonewise from the top to the bottom. The soot body 1 is here held by means of the holding device also in suspended fashion in the vitrification furnace; in addition, it may here be standing with its lower end on a platform if an elongation is to be prevented. While the upper end is being vitrified, attention must be paid that the holding device does not soften, for which purpose the protective sleeve 10 is useful. While the upper soot body end is heated, the soot body 1 is shrinking without vitrifying entirely. It is here shrinking laterally onto the ring disk 9, which thereby centers the holding rod 1 in addition. Moreover, the shrinking soot body 1 covers the upper outer edge of the ring disk 9, thereby stabilizing the ring disk 9 and also the clamping bodies 5 in their position by this embedment in that upward escape is impeded.

In a further variant of the method, the soot body 1 is first supported in standing position with its lower end and the holding device is here "embedded" into the upper end of the soot body 1 without any forces. To this end the holding rod 2 is first lifted to such an extent that the desired clamp connection is established between expanding bearing 4 and soot body 1. The lower soot body end continues to stand on the platform and has only lifted a few millimeters. Thereupon, the upper end of the soot body 1 is vitrified, with the soot body 1 shrinking from above and laterally onto the ring disk 9, thereby stabilizing and centering the holding rod 1 and the clamping bodies 5, as has already been described above. After cooling the holding device is firmly embedded into the upper, partly vitrified soot body end, so that the soot body 1 can be reliably held suspended from the holding rod 2 in the further vitrifying process.

In the method according to the invention, foreign matter, such as graphite, can be dispensed with in the inner bore 11 of the soot body 1. A further advantage is here that also a complete collapsing of the inner bore 11 is enabled during sintering of the soot body 1, if desired.

The invention claimed is:

1. A method for producing a cylinder of quartz glass, said method comprising:
    performing a soot depositing process, wherein $SiO_2$ particles are deposited on an elongate carrier rotating about an axis of rotation so as to form a porous, hollow-cylindrical soot body;
    performing a sintering process wherein the soot body is held suspended in a vertical orientation in a furnace and the soot body has an inner wall defining an inner bore, a longitudinal axis, an upper end and a lower end;
    a holding element holding the soot body, wherein the holding element projects from the upper end into the inner bore of the soot body, and engages a bearing in the inner bore, wherein the bearing comprises an expanding bearing having at least one quartz glass spreading element that is movable against the inner wall of the inner bore, the at least one quartz glass spreading element co-acting with the holding element so that the at least one quartz glass spreading element moves generally outward with a movement component in a direction perpendicular to the longitudinal axis of the soot body and is pressed against the inner wall responsive to weight of the soot body.

2. The method according to claim 1, wherein the holding element comprises at least one lower slide surface that generally upwardly engages the spreading element and extends at a sloping angle relative to the longitudinal axis, viewed from the top to the bottom, in the direction of the inner wall.

3. The method according to claim 2, wherein the lower slide surface is configured as an outer cone of the holding element.

4. The method according to claim 2, wherein the spreading element comprises an upper slide surface cooperating with the lower slide surface-and extending at the sloping angle, viewed from the top to the bottom, in the direction of the inner wall.

5. The method according to claim 4, wherein the at least one spreading element comprises a plurality of movable spreading elements that-each has a respective upper slide surface engageable with the holding element, said upper slide surfaces together forming a downwardly open inner cone of the expanding bearing.

6. The method according to claim 2, wherein the sloping angle at which the at least one lower slide surface extends is between 60° and 80°.

7. The method according to claim 2, wherein the sloping angle at which the at least one lower slide surface extends is about 60°.

8. The method according to claim 1, wherein the at least one spreading element has a friction surface that extends in parallel with the inner wall and, during movement in a direction perpendicular to the longitudinal axis of the soot body, is pressed against the inner wall.

9. The method according to claim 1, wherein the expanding bearing has an upper side on which a ring element of quartz glass is positioned, and wherein the ring element has an outer diameter that is not greater than 10 mm smaller than the inner diameter of the inner bore.

10. The method according to claim 1, wherein the holding element projects with a longitudinal section into the inner bore and wherein at least part of said longitudinal section is surrounded by a protective sleeve.

11. The method according to claim 10, wherein the protective sleeve is of quartz glass.

12. The method according to claim 1, wherein the expanding bearing and the holding element are of quartz glass.

13. The method according to claim 1, wherein weight of the soot body presses the spreading element to co-act with the holding element, resulting in the spreading element moving with the movement component in a direction perpendicular to the longitudinal axis of the soot body.

* * * * *